(12) United States Patent
Atkins

(10) Patent No.: US 9,291,830 B2
(45) Date of Patent: Mar. 22, 2016

(54) MULTIVIEW PROJECTOR SYSTEM

(75) Inventor: Robin A. Atkins, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 287 days.

(21) Appl. No.: 14/001,616

(22) PCT Filed: Feb. 7, 2012

(86) PCT No.: PCT/US2012/024052
§ 371 (c)(1),
(2), (4) Date: Aug. 26, 2013

(87) PCT Pub. No.: WO2012/115768
PCT Pub. Date: Aug. 30, 2012

(65) Prior Publication Data
US 2013/0342814 A1    Dec. 26, 2013

Related U.S. Application Data

(60) Provisional application No. 61/447,063, filed on Feb. 27, 2011.

(51) Int. Cl.
*H04N 13/04* (2006.01)
*G03B 21/28* (2006.01)
*G02B 27/22* (2006.01)
*G02B 26/08* (2006.01)
(Continued)

(52) U.S. Cl.
CPC ........ *G02B 27/2214* (2013.01); *G02B 26/0833* (2013.01); *G02B 26/0875* (2013.01); *G02B 27/22* (2013.01); *G02B 27/2235* (2013.01); *G02B 27/2242* (2013.01); *G02B 27/2264* (2013.01); *G03B 21/14* (2013.01); *G03B 21/142* (2013.01); *G03B 21/28* (2013.01); *G03B 35/24* (2013.01); *H04N 13/0402* (2013.01); *H04N 13/0459* (2013.01); *H04N 13/042* (2013.01); *H04N 13/0409* (2013.01); *H04N 2013/0463* (2013.01)

(58) Field of Classification Search
CPC .......... H04N 13/0459; H04N 13/0402; H04N 913/042; H04N 13/0409; G03B 21/14; G03B 21/142; G03B 21/28; G03B 35/20; G03B 35/22; G03B 35/24; G02B 27/2242; G02B 27/2264; G02B 27/2235; G02B 26/0833; G02B 27/22
USPC ............................................. 353/46, 50, 51, 7
See application file for complete search history.

(56) References Cited

U.S. PATENT DOCUMENTS

| 5,392,140 A | 2/1995 | Ezra |
| 5,465,175 A | 11/1995 | Woodgate |

(Continued)

FOREIGN PATENT DOCUMENTS

| EP | 0470801 | 2/1992 |
| WO | 2010/109170 | 9/2010 |

*Primary Examiner* — William C Dowling
*Assistant Examiner* — Ryan Howard

(57) ABSTRACT

A projector system includes an imaging device operable to direct light to a reflective screen, and an active light steering element placed in the light path between the imaging device and the screen. The steering element is operable to sequentially scan the light across the screen. The steering element may be used to temporally multiplex images at different viewpoints. The steering element enables trade-offs to be made between spatial, temporal, color and/or viewpoint resolutions of the images displayed by the imaging device.

8 Claims, 4 Drawing Sheets

(51) Int. Cl.
*G03B 35/24* (2006.01)
*G03B 21/14* (2006.01)

(56) References Cited

U.S. PATENT DOCUMENTS

| | | | |
|---|---|---|---|
| 5,712,732 A | 1/1998 | Street | |
| 6,337,721 B1 | 1/2002 | Hamagishi | |
| 6,533,420 B1 | 3/2003 | Eichenlaub | |
| 7,050,020 B2 | 5/2006 | Uehara | |
| 7,064,895 B2 | 6/2006 | Morishima | |
| 7,551,341 B1 | 6/2009 | Ward | |
| 7,750,981 B2 | 7/2010 | Shestak | |
| 8,125,702 B2 | 2/2012 | Ward | |
| 2002/0030887 A1 | 3/2002 | Hamagishi | |
| 2005/0057812 A1 | 3/2005 | Raber | |
| 2005/0213182 A1 | 9/2005 | Cossairt | |
| 2005/0270645 A1 | 12/2005 | Cossairt | |
| 2006/0023065 A1 | 2/2006 | Alden | |
| 2006/0244918 A1 | 11/2006 | Cossairt | |
| 2007/0165013 A1 | 7/2007 | Goulanian | |
| 2010/0002193 A1* | 1/2010 | Hines | 353/7 |
| 2010/0259819 A1 | 10/2010 | Hiddink | |
| 2012/0154396 A1 | 6/2012 | Atkins | |
| 2012/0200593 A1 | 8/2012 | Todd | |

* cited by examiner

MULTIVIEW PROJECTOR SYSTEM

CROSS-REFERENCE TO RELATED APPLICATIONS

This application claims priority to U.S. Patent Provisional Application No. 61/447,063, filed 27 Feb. 2011, hereby incorporated by reference in its entirety.

TECHNICAL FIELD

This invention relates to multiview projector systems which can display multiple views within a viewing area. Particular embodiments relate to multiview front-view projector systems.

BACKGROUND

A 3D visual effect may be created by a 3D projector system by operating the projector to deliver left and right images representing different viewpoints to a viewer who is wearing special 3D viewing eyeglasses. For example, the viewer may wear polarized eyeglasses having polarizing filters (e.g. linearly polarized glasses or circularly polarized eyeglasses). In such case the left and right images are each polarized so that they can be seen by the intended eye but not the other eye when wearing the polarized eyeglasses. In other display technologies, the user may wear spectral filtration eyeglasses to view different left and right images. In such case the projector is operated to provide spectrally filtered light to the viewer so that the left eye is presented with light in a first set of spectral bands (providing a left image) and the right eye is presented with light in a complementary, second set of spectral bands (providing a right image). In each case the viewer's brain combines and interprets the left and right images to perceive a single 3D image having the illusion of depth.

A problem with the above-described 3D viewing technologies is that the 3D image viewed using eyeglasses may be prone to flickering and/or image distortion (e.g. the image intensity and coloring may be "off"). Another problem is that the eyeglasses may reduce the image brightness and may be cumbersome to wear. These problems may cause viewer eyestrain and discomfort. There is a general desire for projector systems which can provide an eyeglasses-free 3D viewing experience.

A further problem with the above-described 3D viewing technologies is the lack of a motion parallax depth cue. The effect of motion parallax is that as a viewer moves, closer objects are perceived to shift relatively further than do distant objects. Motion parallax can be simulated by presenting different perspectives of a scene to the viewer as he or she moves from place to place. There is a general desire for projector systems which can produce motion parallax depth cues for a more realistic and enjoyable 3D viewing experience.

Multiview projector systems exist which can be operated to provide different viewpoints (views) to each viewing position. Typically these projector systems illuminate a reflective screen having an optical layer or filter (e.g. having a rippled surface) which reflects the image from the projector toward different viewing positions.

For example, FIG. 1 shows a front-view projector system 9. Front-view projector system 9 includes a projector 12 and a reflective screen 14. Light is projected from projector 12 to screen 14. Screen 14 then reflects the light toward a viewing area in front of the screen. In the illustrated example, two viewers 11A, 11B are shown respectively positioned at viewpoint locations $V_1$, $V_2$. To produce images at multiple viewing locations, such as images at viewpoint locations $V_1$, $V_2$ as shown in FIG. 1, screen 14 may include an optical layer or filter to reflect light to such viewing locations.

A disadvantage of a projector system such as that shown in FIG. 1 is that the spatial resolution of the image at each viewpoint is reduced from the projector resolution by the number of viewpoints. This may result in degradation of image quality. For example, the total resolution of the FIG. 1 projector system may be related to the number of viewpoints and spatial resolution as follows:

$$R = N \cdot VR \qquad \text{Equation [1]}$$

where R is the resolution of the projector (e.g. 1920×1080), N is the number of viewpoints (e.g. 48), and VR is the resulting resolution at each viewpoint (e.g. 40×1080). In this example, viewpoints are multiplexed horizontally. In other cases, viewpoints may be multiplexed vertically, or both horizontally and vertically. For the above example, with 48 viewpoints being displayed, the resolution of the image at each viewpoint (i.e. 40×1080) would be generally too low for producing a good quality image.

Patent literature describing technology in the general field of this invention includes:

US20060244918 "Minimized-thickness angular scanner of electromagnetic radiation" (ACTUALITY SYSTEMS INC; 2 Nov. 2006);

WO2010109170 "Autostereoscopic display" (POPOVICH MILAN MOMCILO; 30 Sep. 2010);

US20050270645 "Optical scanning assembly" (ACTUALITY SYSTEMS INC; 8 Dec. 2005);

US20070165013 "Apparatus and system for reproducing 3-dimensional images" (GOULANIAN E; 19 Jul. 2007);

U.S. Pat. No. 7,750,981 "High-resolution autostereoscopic display" (SAMSUNG ELECTRONICS CO LTD; 6 Jul. 2010);

U.S. Pat. No. 7,064,895 "Stereoscopic image display method and stereoscopic image display apparatus using it" (CANON KK; 20 Jun. 2006);

U.S. Pat. No. 7,050,020 "3D image/2D image switching display apparatus and portable terminal device" (NEC CORP; 23 May 2006);

U.S. Pat. No. 6,337,721 "Stereoscopic display" (SANYO ELECTRIC CO; 8 Jan. 2002);

U.S. Pat. No. 5,712,732 "Autostereoscopic image display adjustable for observer location and distance" (STREET G; 27 Jan. 1998);

U.S. Pat. No. 5,465,175 "Autostereoscopic display device" (SHARP KK; 7 Nov. 1995);

U.S. Pat. No. 5,392,140 "Optical device with two lens arrays with the second array pitch an integral multiple of the first array pitch" (SHARP KK; 21 Feb. 1995);

US20100259819 "Auto-stereoscopic display device" (KONINKL PHILIPS ELECTRONICS NV; 14 Oct. 2010); and US20020030887 "Stereoscopic display without using eyeglasses" (SANYO ELECTRIC CO; 14 Mar. 2002).

There is a general desire for a multiview projector system which can accomplish one or more of the following objectives:

produce images at a higher spatial resolution at each viewpoint than conventional multiview projector systems;

adapt the image displayed at each viewpoint for different viewing circumstances; and optimize or adjust aspects of image quality at each viewpoint.

The foregoing examples of the related art and limitations related thereto are intended to be illustrative and not exclusive. Other limitations of the related art will become apparent to those of skill in the art upon a reading of the specification and a study of the drawings.

SUMMARY

Aspects of the invention provide multiview projector systems. Certain embodiments provide systems, apparatus and methods for adjusting aspects of image quality or resolution for a multiview projector system.

In particular embodiments, a front-view projector system incorporates an active light steering element positioned in the light path between the projector and the screen. The light steering element is operable to sequentially scan light across the screen surface. This can be used to produce images at each viewpoint having an increased spatial resolution over those produced by conventional multiview front-view projector systems. The light steering element enables trade-offs to be made between spatial, temporal, color and/or viewpoint resolutions.

In some embodiments, the light steering element incorporates a series of lenticular lenses which may be dynamically shifted with respect to each other. In other embodiments, the light steering element incorporates an array of micromirrors. In other embodiments, the light steering element is incorporated into a lens of a projector.

In addition to the exemplary aspects and embodiments described above, further aspects and embodiments will become apparent by reference to the drawings and by study of the following detailed descriptions.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
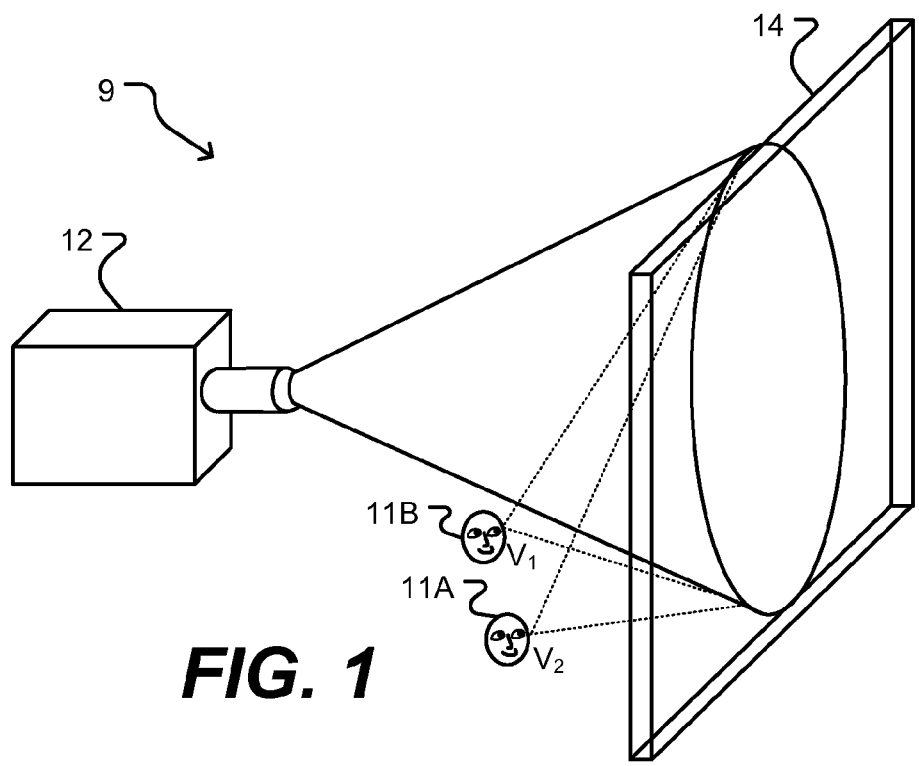
FIG. 1 shows a conventional front-view projector system.
Figure 2:
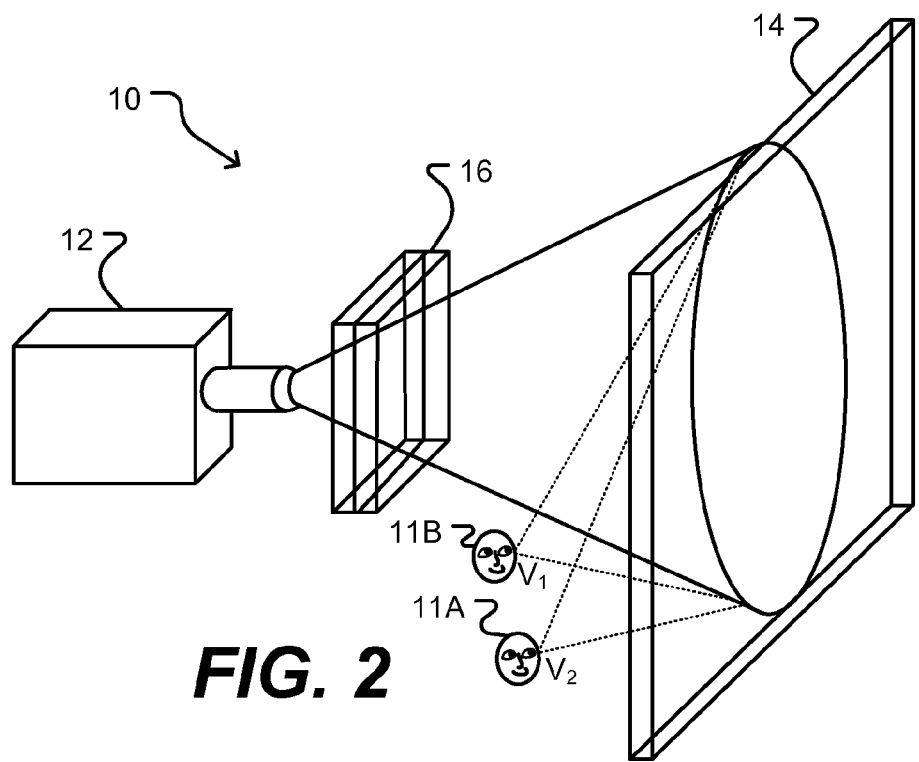
FIG. 2 shows a front-view projector system according to one example embodiment.

FIG. 2 shows a front-view projector system 10 according to one embodiment of the invention. Some components of front-view projector system 10 are similar to those in front-view projector system 9 of FIG. 1 described above. The same reference numerals are used in FIG. 2 to refer to the similar elements. Front-view projector system 10 may be based on any suitable projection display technology such as DLP, LCD, LCoS, LED, laser diode, CRT, or the like.

Front-view projector system 10 incorporates an active light steering element 16 positioned in the light path between projector 12 and reflective screen 14. Light originating from projector 12 passes through steering element 16, which steers the light beams in predetermined directions toward screen 14. Steering element 16 is controllable to direct light beams to locations on screen 14 so that images presented to multiple viewpoint locations (e.g. at viewpoint locations $V_1$ and $V_2$) are temporally multiplexed. In some embodiments, steering element 16 is operable to scan the light beams such that images are presented in a sequence to multiple viewpoint locations.

Figure 5A:
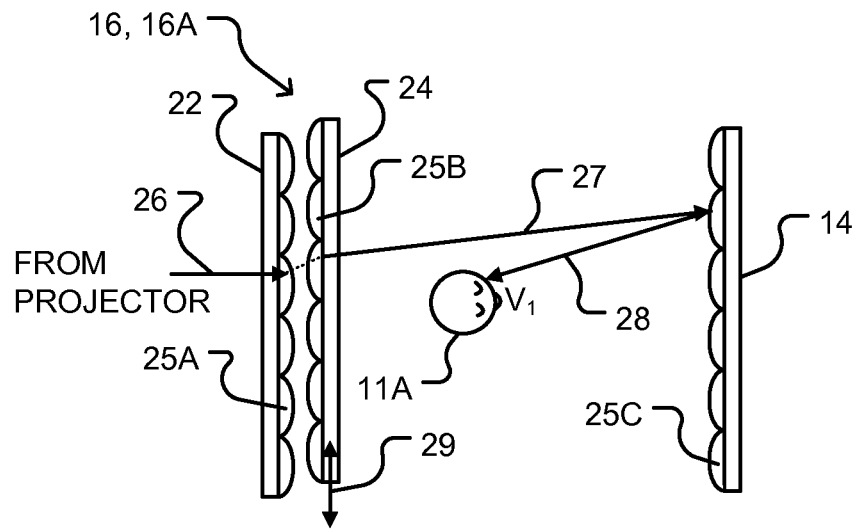
FIGS. 5A and 5B show the operation of a light steering element of a front-view projector system to display images at multiple viewpoints according to one example embodiment.
Figure 5B:
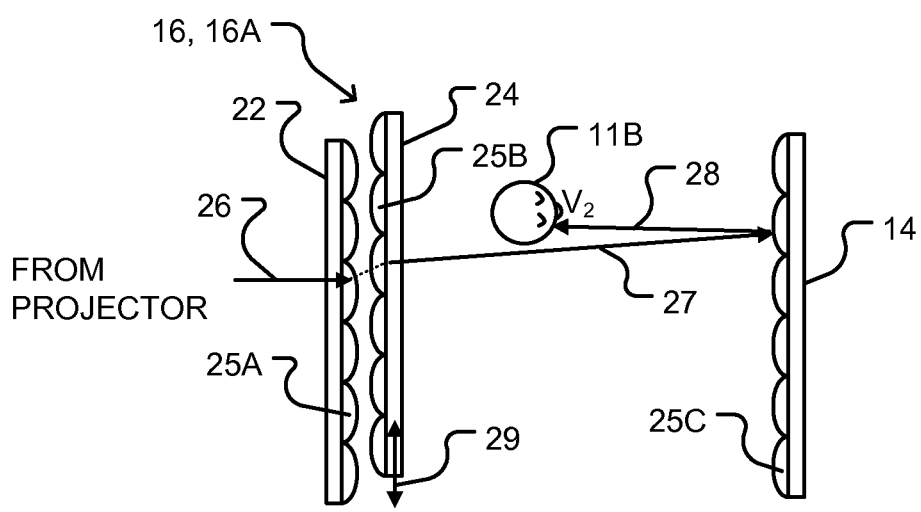

FIGS. 5A and 5B illustrate how an active light steering element placed between a projector and a screen in a front-view projector system (such as front-view projector system 10 of FIG. 2) may be used to temporally multiplex images at different viewpoints. FIGS. 5A and 5B show a light beam from a projector incident at the same location on an active light steering element 16. Depending on the current configuration of steering element 16, the light beam is directed to a particular location on a screen 14 which then reflects the light beam to a particular viewing location. Rays 26, 27 and 28 trace the path of the light beam as it travels from the projector, through steering element 16, to screen 14, and is reflected to the viewer. In the case of FIG. 5A, steering element 16 is set so that the light beam is directed to a viewer 11A located at a viewpoint location $V_1$. In the case of FIG. 5B, steering element 16 is set so that the light beam is directed to a viewer 11B located at a viewpoint location $V_2$.

Steering element 16 may be operated to steer light beams to different locations on screen 14 so that the light is reflected toward viewpoint locations corresponding to a viewer's left and right eyes. A different image can be displayed to each eye to provide a stereoscopic effect. By controlling steering element 16 in time with the light projected from the imaging device, 3D images can be displayed to viewers located at different viewpoint locations. In some embodiments, as the viewer moves from place to place the viewer sees a different 3D image, such as, for example, different perspectives of the same scene, which provides a motion parallax depth cue to the viewer.

Steering element 16 allows spatial resolution (e.g. a measure of how closely lines can be resolved, e.g. 720p, 1080p), temporal resolution (e.g. frame rate, such as 30 Hz, 60 Hz, 120 Hz), and/or color resolution (e.g. color depth that can be displayed, which can be 4-bit, 8-bit, 10-bit color, for example) to be traded off against the number of desired viewpoints. Front-view projector system 10 of FIG. 2 is therefore controllable to adjust or optimize the image quality or resolutions for the specific application or viewing circumstances. This provides more flexibility in the design or configuration of a multiview projector system than previously possible with projector systems such as that shown in FIG. 1.

For front-view projector system 10 of FIG. 2, assuming that viewpoints are multiplexed in one direction (e.g. horizontally), the total projector bandwidth can be related to the image resolutions as follows:

$$P = B \cdot F \cdot N \cdot VR \qquad \text{Equation [2]}$$

where P is the total projector bandwidth, B is the bit depth for each pixel, F is the frame rate for the image at each viewpoint, N is the number of viewpoints, and VR is the spatial resolution for the image at each viewpoint.

Front-view projector system 10 preferably has a high available total projector bandwidth P (i.e. the on/off state for each controllable element is adjustable at a high frequency). For example, suppose that front-view projector system 10 is based on DLP projection technology and each pixel on screen 14 can be updated at 23,148 Hz. This can be used to update each pixel 385 times per frame for a 60 fps video stream, allowing for a maximum 8-bit color depth. Alternately, it can be used to update each pixel 192 times per frame for a 120 fps video stream, allowing for a maximum 7-bit color depth.

When front-view projector system 10 is operated for multiview display (e.g. by using steering element 16 to sequentially scan the projected light across screen 14 so as to temporally multiplex images at multiple viewpoints), the total pixel refresh rate is further subdivided. A few exemplary combinations are shown in the table below:

TABLE I

| Number of viewpoints | Viewpoint resolution | Viewpoint framerate | Viewpoint color depth |
|---|---|---|---|
| 1 | 1920 × 1080 | 60 fps | 385 (8-bit) |
| 2 | 1920 × 1080 | 60 fps | 192 (7-bit) |
| 10 | 1920 × 1080 | 30 fps | 77 (6-bit) |
| 48 | 960 × 1080 | 24 fps | 40 (5-bit) |

In some embodiments, dithering may be performed to enhance image quality. For example, any suitable method for spatial, temporal and/or color-depth dithering may be used to increase effective resolution.

As can be appreciated from Table 1 above, color depth may be degraded with increasing viewpoint resolution (number of views). It may be desirable to regain some color depth using dual modulation techniques. For example, suitable methods are described in commonly-owned United States Application Publication No. 2009/0225234 entitled "Serial Modulation Display Having Binary Light Modulation Stage" (Ward et al.) which is hereby incorporated herein by reference in its entirety.

Figure 3:
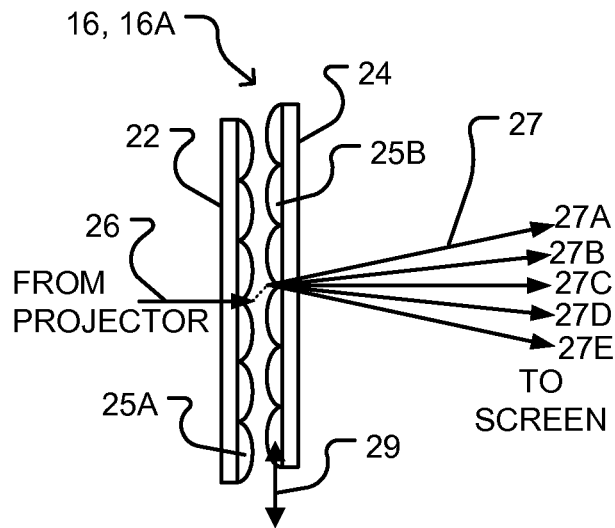
FIG. 3 shows a light steering element according to one example embodiment that may be used in the FIG. 2 front-view projector system.

Steering element 16 of front-view projector system 10 may comprise any optical element which can controllably steer light in an indicated direction. FIG. 3 shows an active light steering element 16A according to one embodiment. Steering element 16A includes two lenticular lens arrays 22, 24 which can be displaced relative to each other. The relative positions of lens arrays 22, 24 may be adjusted to direct light beams in different directions toward a screen so as to display images at multiple viewpoints. For example, FIG. 3 shows a light beam 26 from an imaging device (e.g. a projector) which is incident at the same location on steering element 16A. By displacing lens array 24 relative to lens array 22, the light beam can be directed in different directions, such as the directions indicated by rays 27A, 27B, 27C, 27D and 27E. Each of these light rays may be reflected by the screen to a different viewpoint location.

In the FIG. 3 embodiment, first lens array 22 is fixed, and second lens array 24 can be controlled to oscillate back and forth in directions indicated by double-headed arrow 29. In other embodiments, both lens arrays may be moveable in opposite directions. This may be helpful to counterbalance any vibrations caused by the oscillatory displacement of the lens arrays. In some embodiments, additional lenses may be provided before or after lens arrays 22, 24 to collimate, focus, diffuse, or otherwise modify the light.

In certain embodiments, lenticular lenses 25A, 25B of lens arrays 22, 24 are sinusoidally offset against each other. The lenses may move a full or half period once per image frame.

To calibrate lens arrays 22, 24, a mapping may be determined between viewpoints and projector image pixels, for a given location of lenses 25A, 25B at each sub-frame. The mapping may be stored in a look-up table or represented as a suitable algorithm. Such mapping may then be used to control the multiplexing of the projector image pixels for each sub-frame to reconstruct the desired views at the viewer position. Any suitable mapping technique may be used. For example, one may use one or more of the mapping techniques described in United States Patent Application Publication No. 2007/0165013 entitled "Apparatus and System for Reproducing 3-Dimensional Images" (Goulanian et al.) and United States Patent Application Publication No. 2005/0270645 entitled "Optical Scanning Assembly" (Cossairt et al.).

The number of viewpoints is determined by the frequency of the lenticular displacement compared to the refresh rate of the imaging device. For example, if the imaging device is creating a unique image every 0.01 seconds, and steering element 16 sweeps the views across each reflective ripple every 0.1 seconds, 10 views will be generated. For 2D viewing, the refresh rate of both the steering element and imaging device can be equal.

FIG. 3 shows lenticular lens arrays for the active light steering element. However, lenticular lenses are not necessary. In some embodiments, active light steering element 16 may comprise arrays of other types of lenses which are capable of steering the light in predetermined directions.

For example, in some embodiments, active light steering element 16 may incorporate mechanisms used for lens-based optical image stabilization. An example of such mechanism is a floating lens element which is moveable orthogonally to the optical axis of the lens element using electromagnets. The lens can be offset from the imaging device (e.g. DLP, etc.) to steer the light in a predetermined direction toward a screen.

In other embodiments, active light steering element 16 may incorporate lens shifting mechanisms used for adjusting a projector lens position in order to move a projected image in a vertical, horizontal or diagonal plane. The projector lens and lens shifting mechanism may be operated to steer the light in a predetermined direction toward a screen.

Figure 4:
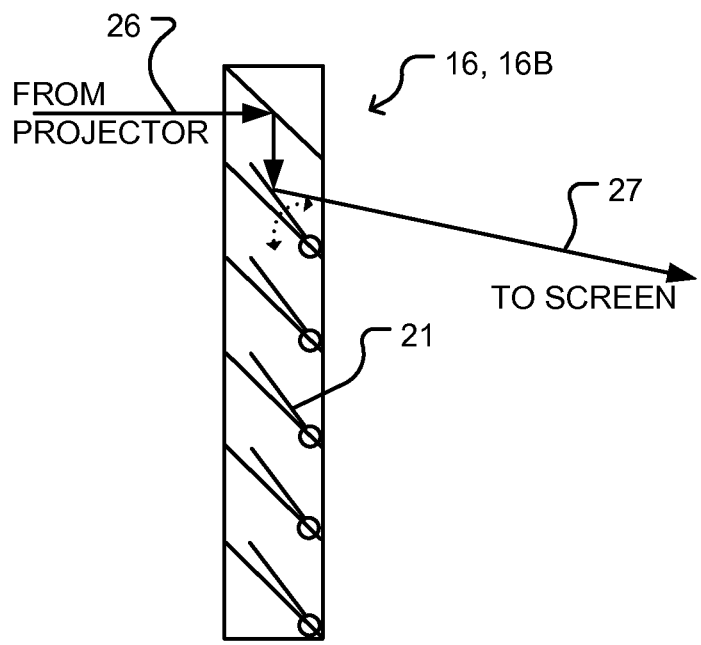
FIG. 4 shows a light steering element according to another example embodiment that may be used in the FIG. 2 front-view projector system.

FIG. 4 shows an active light steering element 16B according to another embodiment. Steering element 16B includes an array of micromirrors 21 (e.g. MEMS mirrors). Each micromirror 21 may be moved (e.g. pivoted or rotated) to a particular position to steer light beams in predetermined directions toward a screen, to achieve the same result as the FIG. 3 embodiment (i.e. temporal multiplexing of images between viewpoints).

In other embodiments, active light steering element 16 may use refraction instead of reflection to steer light in the desired directions. For example, moveable micromirrors 21 of the FIG. 4 embodiment may be replaced with thin sheets of transparent material. As another example, an array of hinged transparent flaps may be provided. Each flap may be moved about its hinge to steer light beams in a particular direction toward a screen. As light passes through each flap, it is refracted in a particular direction according to the angle of the flap.

Screen 14 of front-view projector system 10 of FIG. 2 may comprise a reflective surface which is substantially specular in at least the horizontal direction to reflect light toward a desired viewing position. Some diffusion in the vertical direction may be desirable in order to provide an image to the desired range of vertical viewing positions. Any suitable diffuser having an asymmetric diffusion pattern may be used.

Screen 14 may be corrugated with a lenticular pattern in order to distribute the reflected light toward the desired viewing positions. The lenticular pattern may be created by corrugating a reflective material, or laminating a reflective material to a corrugated surface. It may also be created by overlaying a flat reflective material with a transparent film having a lenticular lens array. For example, FIGS. 5A and 5B show an array of lenticular lenses 25C on screen 14. In any of these configurations a diffuser having an asymmetric diffusion pattern may be laminated on top of the reflective surface.

The corrugations on screen 14 may have any suitable shape. Where the viewpoints are multiplexed horizontally, screen 14 preferably has at least one bump or protrusion for each pixel column such that incident light may be reflected to the desired viewpoint. The particular shape of the corrugated screen surface may be optimized for the viewing conditions. Example shapes for corrugated screen surfaces are described in commonly-owned U.S. Provisional Application Ser. No. 61/236,796 entitled "3D Capture and/or Display Systems and Methods", which is hereby incorporated herein by reference in its entirety.

Screen 14 may be reflective in only specific wavelengths of light, corresponding to the illumination spectrum from the projector (e.g. LEDs, lasers). This can substantially reduce reflections from ambient broadband light, thereby increasing the contrast of the reflected image.

Figure 6:
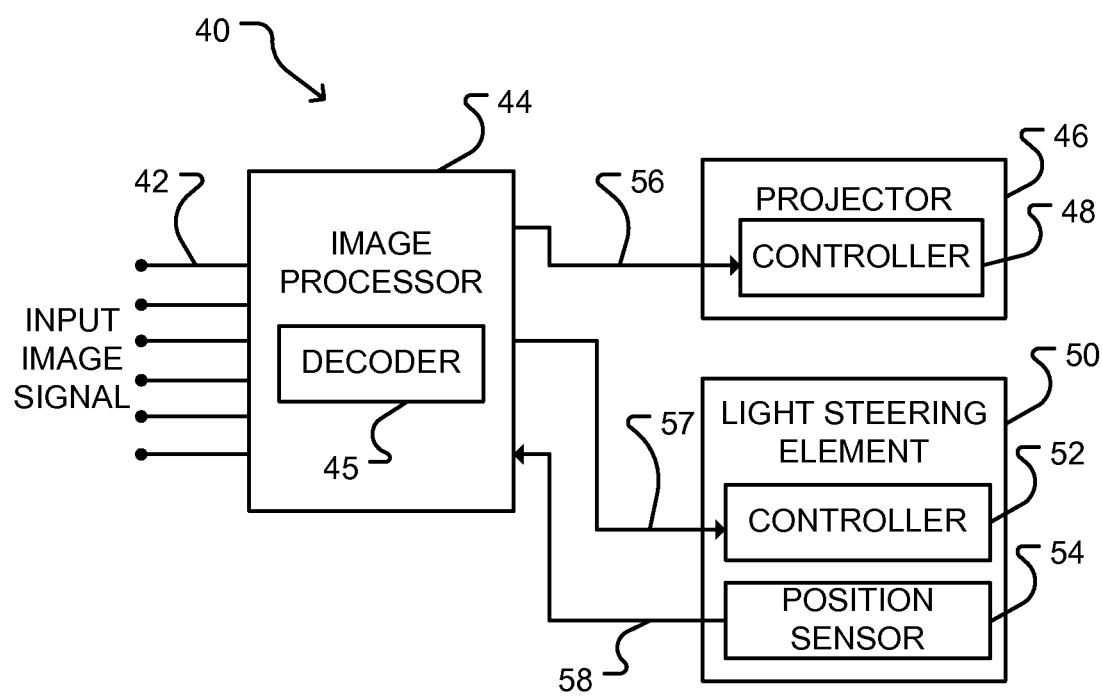
FIG. 6 schematically illustrates apparatus for controlling a front-view projector system according to one embodiment.

FIG. 6 shows apparatus 40 for controlling a front-view projector system according to one embodiment. Apparatus 40 may be used in front-view projector system 10 of FIG. 2, for example. Apparatus 40 includes an image processor 44. Image processor 44 may comprise a central processing unit (CPU), one or more microprocessors, one or more FPGAs, or any other suitable processing unit(s).

Image processor 44 receives one or more input image signals 42. In particular embodiments image data for each viewpoint is provided in a separate input image signal 42.

In the illustrated embodiment, image processor 44 incorporates a decoder 45 which decodes the input image signals 42. Based on the decoded image signal, image processor 44 generates a control signal 56 for driving a projector 46. Control signal 56 is provided to a controller 48 of projector 46. Image processor 44 also generates a control signal 57 for driving a light steering element 50. Control signal 57 is provided to a controller 52 of light steering element 50. For a given image signal, image processor 44 is configured to determine the configuration of light steering element 50 that would direct the light in a particular direction so that it is reflected by the projector screen to the desired viewpoint location. Image processor 44 may use a predetermined mapping of viewpoints and projector image pixels to determine the appropriate configuration for light steering element 50.

In the FIG. 6 embodiment, light steering element 50 has a position sensor 54 which monitors the position of one or more components of light steering element 50 and provides a position feedback signal 58 to image processor 44. Position feedback signal 58 may be used by image processor 44 to determine and adjust control signals 56, 57.

Embodiments of the front-view projector system described herein advantageously enable:

an eyeglasses-free 3D viewing experience in a projection environment;

a 3D viewing experience incorporating a motion parallax depth cue; and the ability to balance trade-offs between spatial, temporal, color, and/or viewpoint resolutions to adjust or optimize image quality produced by an imaging device.

Some applications for the front-view projector systems described herein include digital cinema displays and virtual reality displays.

Systems and methods for managing trade-offs between spatial, temporal, color, and/or viewpoint resolutions in a multiview display are described in commonly-owned U.S. Provisional Patent Application Ser. No. 61/440,965 entitled "Resolution Management for Multiview Display Technologies", which is hereby incorporated herein by reference in its entirety. Front-view projector system 10 of FIG. 2 may incorporate or be combined with the resolution management system and apparatus described in such application. One or more of the resolution management methods described in such application may be used to control front-view projector system 10 to adjust spatial, temporal, color and/or viewpoint resolutions for different viewing circumstances and applications.

Embodiments of the front-view projector system described herein may be combined with one or more of the following display technologies:

a narrow-band light source (e.g. LEDs, lasers), coupled with a screen that is reflective in only the narrow-band frequencies of the light source, may be used to increase image contrast;

a narrow-band light source (e.g. LEDs, lasers), coupled with a screen that has a selective spectral reflectance in the narrow primaries, may be used to increase the color gamut; and dual modulation.

This can provide a multiview, high contrast, and wide color gamut viewing experience.

Where a component (e.g. a processor, screen, filter, mirror, lens, projector, front-view projector system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

While a number of exemplary aspects and embodiments have been discussed above, those of skill in the art will recognize certain modifications, permutations, additions and sub-combinations thereof. For example:

Front-view projector system 10 of FIG. 2 shows one imaging device (i.e. projector 12) operable to direct light toward reflective screen 14. In other embodiments, a front-view projector system may incorporate multiple imaging devices operable to direct light toward one or more reflective screens 14. Light from each imaging device may pass through a corresponding active light steering element 16 so as to sequentially scan the light across the screen. Systems incorporating multiple projectors 12 and light steering elements 16 may be operated to temporally multiplex the images at multiple viewpoints.

In some embodiments, active light steering element 16 may be incorporated with the optical system in the imaging device.

As described above, embodiments of the front-view projector system may be operated to display different images at each viewpoint. Each viewpoint may present a different perspective of the same scene (e.g. to provide motion parallax depth cue) or an entirely different scene altogether (e.g. such that a different movie can be viewed at each viewpoint).

In some embodiments, reflective screen 14 may be replaced with a transmissive screen, providing a rear-view projection system. The transmissive screen may incorporate a lenticular sheet for directing the incident light to multiple viewpoint locations behind the screen. The apparatus described herein (e.g. active light steering element 16) for temporally multiplexing images may be incorporated in such rear-view projection system.

It is therefore intended that the following appended claims and claims hereafter introduced are interpreted to include all such modifications, permutations, additions and sub-combinations as are within their true spirit and scope.

What is claimed is:

1. A projector system comprising:
a reflective screen;
an imaging device operable to direct light from a light source toward the screen so that the light is reflected by the screen to a viewing area;
a light steering element positioned in a light path between the imaging device and the screen, the steering element operable to steerably direct the light from the light source to selected locations on the screen; and
a resolution management system operable to control the light steering element so as to adjust at least one of spatial, temporal, color and viewpoint resolutions of images displayed by the imaging device,
wherein the imaging device is operable to display images for multiple viewpoints, and for each image the steering element is operable to scan the light to locations on the screen such that the light is reflected by the screen to a corresponding viewpoint location.

2. A projector system according to claim 1, wherein the light steering element comprises two arrays of lenticular lenses, wherein at least one of the arrays is displaceable with respect to the other array in a direction parallel to the arrays.

3. A projector system according to claim 1, wherein the light steering element comprises a plurality of micromirrors.

4. A projector system according to claim 1, wherein the screen comprises a corrugated surface.

5. A projector system according to claim 4, wherein the corrugated surface comprises a lenticular pattern.

6. An image processor configured to receive one or more input image signals, and based on the input image signals:
generate a first control signal for output to a projector, the first control signal driving the projector to display an image; and
generate a second control signal for output to an active light steering element positioned in a light path between the projector and a screen, the second control signal driving the light steering element to sequentially scan light for the image across the screen,
wherein the image processor is further configured to:
generate the first control signal so as to drive the projector to display images for multiple viewpoints; and
generate the second control signal so as to drive the light steering element to scan the light for each image to locations on the screen such that the light is reflected by the screen to a corresponding viewpoint location.

7. An image processor according to claim 6, wherein the image processor is further configured to receive a position feedback signal from the light steering element, and based on the position feedback signal, determine or adjust the second control signal for subsequent images.

8. A projector system comprising:
a transmissive screen;
an imaging device operable to direct light from a light source toward the screen;
a light steering element positioned in a light path between the imaging device and the screen, the steering element operable to steerably direct the light from the light source to selected locations on the screen; and
a resolution management system operable to control the light steering element so as to adjust at least one of spatial, temporal, color and viewpoint resolutions of images displayed by the imaging device,
wherein the imaging device is operable to display images for multiple viewpoints, and for each image the steering element is operable to scan the light to locations on the screen such that the light is directed by the screen to a corresponding viewpoint location behind the screen,
wherein the light steering element comprises a plurality of micromirrors.

* * * * *